(12) United States Patent
Nakamura

(10) Patent No.: US 9,299,513 B2
(45) Date of Patent: Mar. 29, 2016

(54) THIN KEYBOARD

(71) Applicant: Lenovo (Singapore) PTE. LTD., Singapore (SG)

(72) Inventor: Fusanobu Nakamura, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 254 days.

(21) Appl. No.: 14/044,427

(22) Filed: Oct. 2, 2013

(65) Prior Publication Data

US 2014/0168875 A1   Jun. 19, 2014

(30) Foreign Application Priority Data

Dec. 19, 2012  (JP) .................. 2012-276622

(51) Int. Cl.
*G06F 1/16* (2006.01)
*H01H 13/7065* (2006.01)
*H01H 5/02* (2006.01)

(52) U.S. Cl.
CPC ......... *H01H 13/7065* (2013.01); *G06F 1/1666* (2013.01); *H01H 5/02* (2013.01); *H01H 2215/042* (2013.01); *H01H 2221/04* (2013.01); *H01H 2227/036* (2013.01)

(58) Field of Classification Search
CPC ...... G06F 3/0219; G06F 3/0221; H01H 13/02
USPC ........................................ 361/679.08–679.17
See application file for complete search history.

(56) References Cited

U.S. PATENT DOCUMENTS

| | | | | |
|---|---|---|---|---|
| 3,671,822 | A | * | 6/1972 | Theodore M. Leno ....... 361/288 |
| 5,602,715 | A | * | 2/1997 | Lempicki et al. ......... 361/679.13 |
| 5,635,928 | A | * | 6/1997 | Takagi et al. .................... 341/22 |
| 5,793,605 | A | * | 8/1998 | Sellers ..................... 361/679.13 |
| 5,857,148 | A | * | 1/1999 | Weisshappel et al. ...... 455/575.3 |
| 6,314,274 | B1 | * | 11/2001 | Kumagai ..................... 455/90.3 |
| 7,221,561 | B2 | * | 5/2007 | Pan et al. ................. 361/679.08 |
| 2006/0120029 | A1 | * | 6/2006 | Ryu et al. ....................... 361/680 |
| 2010/0240425 | A1 | * | 9/2010 | Madsen et al. ............. 455/575.4 |
| 2011/0170250 | A1 | * | 7/2011 | Bhutani et al. ............. 361/679.2 |
| 2012/0169603 | A1 | | 7/2012 | Peterson et al. | 
| 2012/0268384 | A1 | | 10/2012 | Peterson et al. |

FOREIGN PATENT DOCUMENTS

CN  201741608 U  *  2/2011 ............. H01H 13/02

* cited by examiner

*Primary Examiner* — Adrian S Wilson
(74) *Attorney, Agent, or Firm* — Antony P. Ng; Russel Ng PLLC

(57) ABSTRACT

A thin keyboard having multiple keys is disclosed. At least one of the keys includes a key magnet, and a holding magnet is mounted on a transverse slider. The key is located in a ready position by a magnetic attraction of the holding magnet to the key magnet. When the transverse slider is slid, a separating protrusion pushes a chamfer to widen the distance between the holding magnet and the key magnet. The distance between both magnets is also widened in a right and left direction, and when the magnetic attraction drops, the key is located by gravity in a release position.

14 Claims, 13 Drawing Sheets

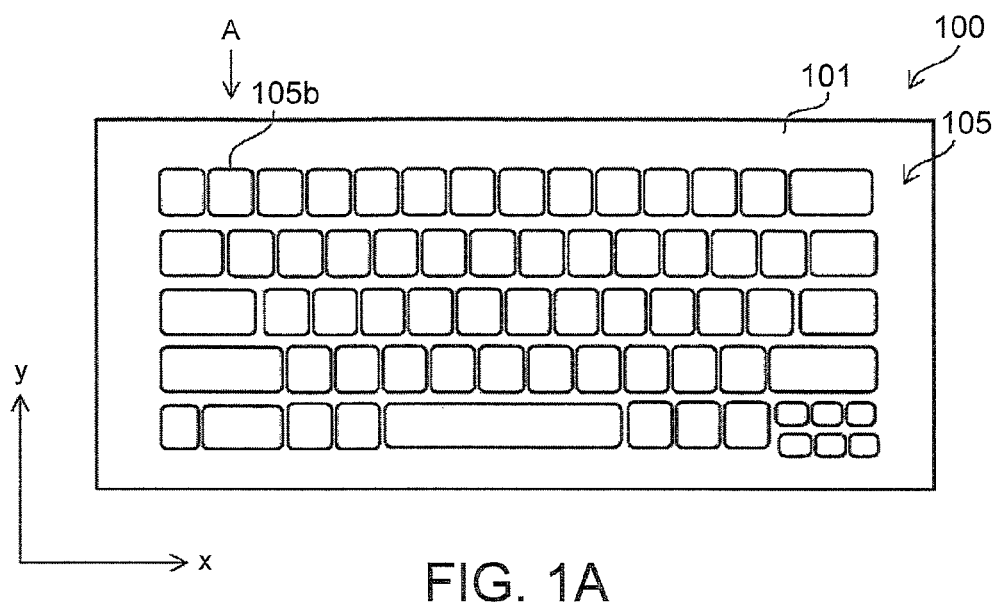
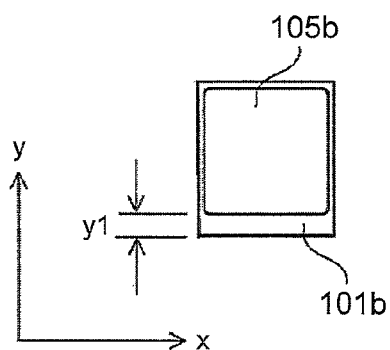 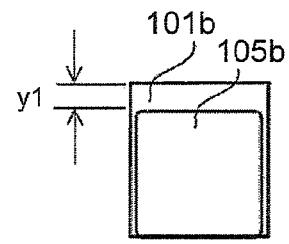
FIG. 1B  FIG. 1C
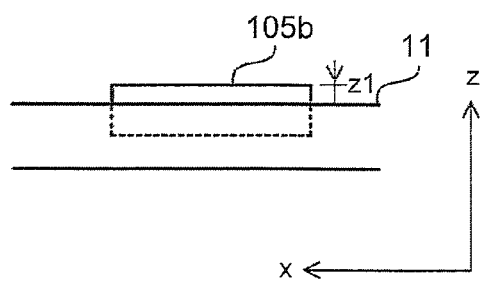 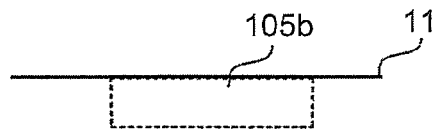
FIG. 1D  FIG. 1E

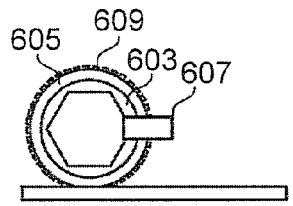
FIG. 14A
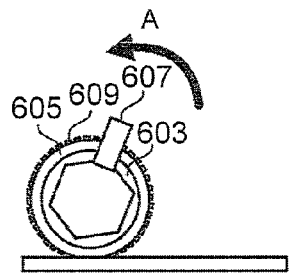
FIG. 14B
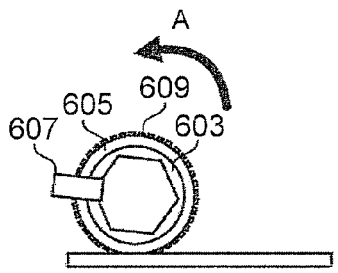
FIG. 14C
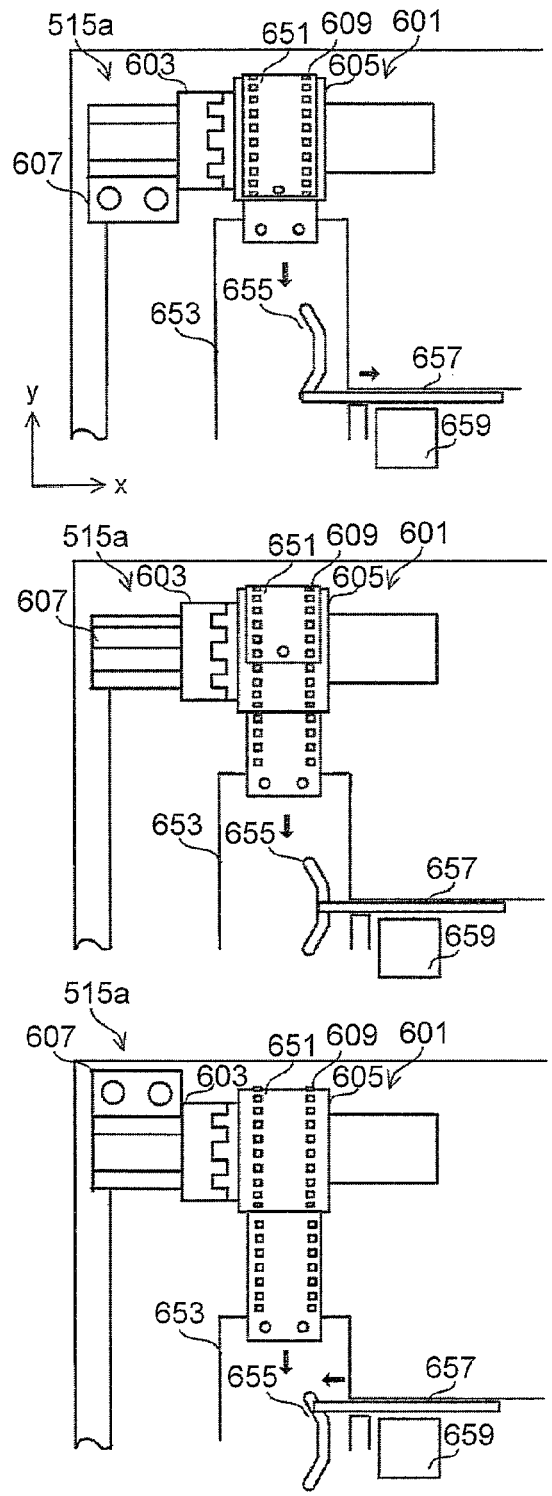

THIN KEYBOARD

PRIORITY CLAIM

The present application claims benefit of priority under 35 U.S.C. §§120, 365 to the previously filed Japanese Patent Application No. JP2012-276622 with a priority date of Dec. 19, 2012, which is incorporated by reference herein.

BACKGROUND OF THE INVENTION

1. Technical Field

The present invention relates to input devices in general, and particularly to a thin keyboard that locates each key in a ready position by means of magnets.

2. Description of Related Art

A keyboard is supposed to give a user an operation feeling (tactile) of a switching operation with a finger and not to give the user a feeling of fatigue even when the user performs keyboard operations for a long time. To accommodate the needs, a so-called pantograph type keyboard is employed in many laptop personal computers (laptop PCs). In the pantograph type keyboard, each key includes a supporting structure called a pantograph (or a scissor mechanism) and an elastic member called a rubber dome to give a reaction force to the pressing pressure of a finger.

The pantograph type keyboard is so configured that as a depressed keycap travels in a vertical direction little by little, the bottom of the pantograph gradually crushes the top of the rubber dome. As the travel distance in the vertical direction gets longer, the degree of deformation of the rubber dome gets larger, increasing the reaction force to the finger. Then, when the travel distance becomes further longer, the top of the rubber dome that has just reached a yield point gets dented suddenly, resulting in a drop in reaction force.

Since the key switch is set to operate immediately after the yield point, the user feels the drop in reaction force and becomes aware of the operation of the key switch. Since the user cannot stop the operation of the finger suddenly even if the user feels a sudden drop in reaction force, the user further holds the key down even after the key switch is activated. After the reaction force is further increased along with traveling of the key, the user eventually stops the pressing operation. Such an operation feeling cannot be derived from a software keyboard appearing on a display. The operation feeling is a characteristic unique to a keyboard involving physical traveling of a key.

Since the pantograph can maintain the posture of a keycap even if an edge of the keycap is pressed down with a finger, the top face of the keycap is maintained substantially in a horizontal position while the keycap is traveling in the vertical direction. However, a predetermined stroke is required for traveling of the keycap in the vertical direction, the pantograph type keyboard has a limitation on the application to thin laptop PCs.

FIG. 15 is a side cross-sectional view for describing the principle of a thin keyboard that gives an operation feeling as approximate as that given by a pantograph type keyboard. A key 10 includes a keycap 11, a frame 19, and a base 21. A magnet 17b is mounted in an edge portion of the keycap 11, and a magnet 17a for attracting the magnet 17b is mounted in the frame 19. Chamfers 13a and 13b are formed on the lower side (inner side) of the keycap 11.

Ramps 15a and 15b each having a chamfer are provided on the base 21. The shapes and angles of the chamfers 13a and 13b are adjusted to slide on the chamfers of the ramps 15a and 15b. Only two pairs of chamfers and ramps are shown in the figure, but they are actually placed below the four corners of the keycap 11 whose flat surface is shaped into a rectangle. FIG. 15A shows a ready position before the key 10 is pressed down. In the ready position, the keycap 11 is located at the topmost position in a Z-axis direction (vertical direction) by a magnetic attraction between the magnets 17a and 17b. At this time, four sets of ramps and chamfers maintain the keycap in a horizontal position.

FIG. 15B shows a state in which the key 10 is pressed down. In the ready position, since the magnets 17a and 17b are strongly attracted to each other, the finger is made to feel resistance to the pressing force. When the pressing force is increased to overcome the resistance, the chamfers 13a and 13b slide down the chamfers of the ramps 15a and 15b to generate a force component in the X-axis direction (horizontal direction) against the pressing force in the Z-axis direction. Thus, when the key 10 is pressed down, the keycap 11 travels in the Z-axis direction and the X-axis direction at the same time.

The magnetic attraction between the magnet 17a and the magnet 17b is inversely proportional to the square of the distance. When the magnets are separated by a certain distance or more, the magnetic attraction between both magnets and the resistance to the finger caused by the magnetic attraction drop suddenly, shifting to a state shown in FIG. 15C. In FIG. 15C, the keycap 11 travels to the maximum position limit in the Z-axis direction and the X-axis direction to activate the key switch (not shown) placed on the surface of the base 21. At this time, the user feels a sudden drop in resistance to the finger and becomes aware of the operation of the key switch.

When the user lifts the finger off the key or weakens the depression force, the keycap 11 is returned to the ready position by the magnetic attraction between the magnets 17a and 17b. The sets of chamfers of the keytop and chamfers of the ramps maintain the posture of the keycap 11 during the ready position and traveling. The keycap 11 travels in the Z-axis direction by a predetermined stroke, but the user feels as if the keycap 11 traveled by a stroke longer than the predetermined stroke until the user feels a strong reaction force to the finger. Thus, the key 10 can convert the depression pressure on the keycap 11 into traveling in the vertical direction and the horizontal direction not only to give a good operation feeling while keeping the keycap 11 in a horizontal position, but also to make the keyboard thinner.

The keyboards disclosed in the related art documents include a mechanism for converting the depression pressure in the vertical direction into traveling of the key in the vertical direction and the horizontal direction. Hereinafter, this type of keyboard is called an oblique slide-type keyboard in this specification. The oblique slide-type keyboard is so configured that the surface of the keycap 11 in the ready position is protruded by a length S from the surface of the frame 19 as shown in FIG. 15A.

When the oblique slide-type keyboard is mounted on a laptop PC, it is necessary to have a clearance between a display and the keyboard face to protect keycaps or the display from being damaged when a display housing is so closed that the display and the keyboard face each other. Since the length of the keyboard in the vertical direction in FIG. 15A becomes one of factors for deciding on the thickness of the laptop PC, it is desirable to make the oblique slide-type keyboard even thinner.

SUMMARY OF THE INVENTION

In accordance with a preferred embodiment of the present invention, an input device includes a key located in a ready position by means of magnets. The input device has the key with a key magnet mounted therein, and a holding magnet for locating the key in the ready position by a magnetic attraction to the key magnet. A release mechanism increases the distance between the holding magnet and the key magnet to make the key travel from the ready position to a release position. The release mechanism can return the distance between the holding magnet and the key magnet to the distance in the ready position to make the key travel from the release position to the ready position.

When the key travels to the release position, the position of the keycap is moved downward, and this can make the input device thinner when no key operation is performed. When the input device is used as a touch pad in addition to the key operation, a difference in level between the key and a key cover can be eliminated to provide a flat operation face. Further, when the input device is used for a convertible type laptop PC that can use the input device in a PC mode or a tablet mode, the key of the input device can be prevented from touching the top of a desk and hence being damaged during use in the tablet mode. The input device may also have a traveling mechanism for making the key travel in a vertical direction and a horizontal direction at the same time when the key travels from the ready position to the release position.

The release mechanism can include multiple holding magnets mounted therein and a first slider capable of sliding across multiple keys in the horizontal direction. As a result, the first slider can be slid to locate the multiple keys in the release position at the same time. If the first slider includes a separation mechanism for applying, to the key, a force in a direction to separate the key magnet from the holding magnet, the distance between the key magnet and the holding magnet can be further widened to locate the key in the release position effectively.

The separation mechanism can be configured to prevent the key located in the release position from traveling to the ready position. The traveling mechanism may include a ramp structure for causing the key to come down up to the release position by gravity when the magnetic attraction between the key magnet and the holding magnet becomes lower than the magnetic attraction in the ready position.

The ramp structure may include a prevention mechanism for preventing the key located in the release position from traveling in the vertical direction. If the release mechanism includes a second slider sliding in the horizontal direction to slide multiple first sliders, a greater number of keys can further be located in the release position with an operation of the second slider. Further, if the second slider includes a timing adjustment mechanism for delaying the timing of causing the maximum value of a reaction force exerted on the second slider by each of the multiple first sliders, the power of shifting the second slider can be reduced. When the key cover is arranged around the multiple keys, the keys are so configured that the top of the keys is protruded from the key cover in the ready position and the top of the keys is located almost flush with the key cover in the release position.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIGS. 1A-1E are diagrams of an oblique slide-type keyboard;

FIGS. 14A-14C are diagrams of a release mechanism applied to the laptop PC; and

DETAILED DESCRIPTION OF A PREFERRED EMBODIMENT

Figure 2:
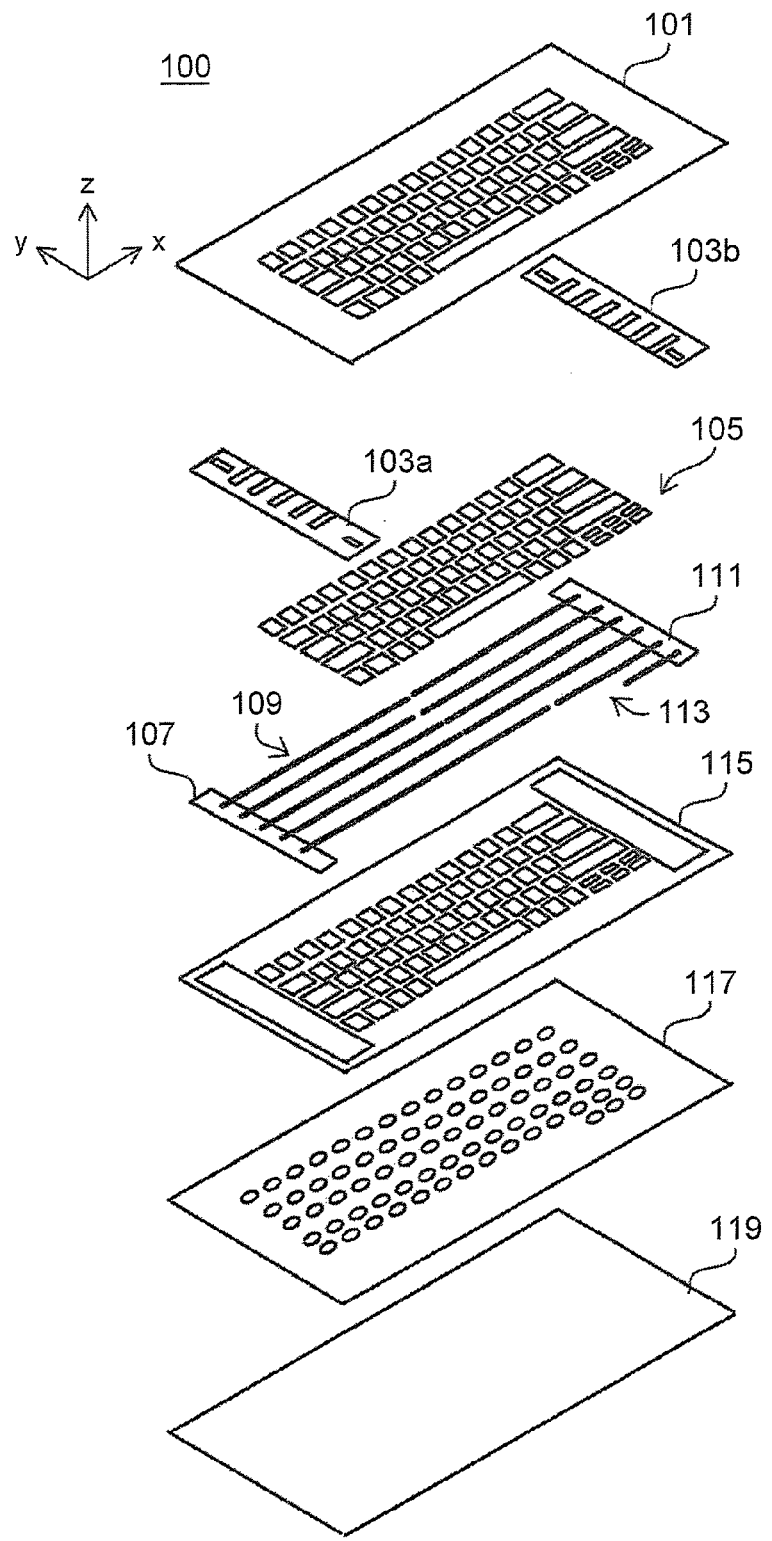
FIG. 2 is an exploded perspective view of the keyboard from FIG. 1.

FIG. 1 is a diagram for describing an outline of an oblique slide-type keyboard (hereinafter, simply referred to as the keyboard) 100. FIG. 1A is a plan view of the entire keyboard, FIGS. 1B and 1C are plan views in the vicinity of a key 105*b*, and FIGS. 1D and 1E are side views in the vicinity of the key 105*b* as viewed from a direction of arrow A in FIG. 1A. A key cover 101 and a key group 105 including the key 105*b* are shown in FIG. 1A. A cover opening 101*b* is formed in the key cover 101 at a position where each key is arranged as representatively shown in FIGS. 1B and 1C.

FIGS. 1B and 1D show a state before the key 105*b* is pushed down with a finger, and FIGS. 1C and 1E show a state in which the key 105*b* is pushed down with the finger or the key is released according to the present invention. Here, three-dimensional rectangular coordinates are defined for the keyboard 100 as shown in FIGS. 1A and 1D. The x axis is set to a longitudinal direction on a plane of the key cover 101, the y axis is set to a short-length direction, and the z axis is set to a direction perpendicular to the plane of the key cover 101. It is assumed that the position of a finger in the z-axis direction when a user operates the keyboard 100 placed on a desk is referred to as "up" and the position of the desk is referred to as "down." It is also assumed that the position of a hand in the y-axis direction when the user operates the keyboard 100 is referred to as "front" and the opposite position is referred to as "back." Right and left are set in the x-axis direction in FIG. 1A.

It is further assumed that the position of a top plane (keycap) of the key 105*b* in the z-axis direction before being pushed down is referred to as a ready position, a position in a depressed state is referred to as a depression position, and a position when the key is released according to the present invention is referred to as a release position. The depression position is a position in the z-axis direction when depression pressure is exerted on the key 105*b* with a finger.

As will be described later, the release position is a position in the z-axis direction when the key is located by the weight of the key or by a compelling force of an auxiliary member. The positions of the key in the depression position and the release position are almost the same because they are located on a side lower than the ready position, but they are slightly different due to a difference in positioning method. When the position of the key 105*b* varies between the depression position and the release position by means of a traveling mechanism to be described later, the key varies the position in the z-axis direction and the position in the y-axis direction at the same time without varying the position in the x-axis direction.

In the plan views of FIGS. 1B and 1C, the size of the cover opening 101*b* is larger than that of the key 105*b* in the y-axis direction. As shown in FIG. 1B, a traveling space of y1 long is formed in the ready position between the front edge of the cover opening 101*b* and the front edge of the key 105*b*, and as shown in FIG. 1D, the keycap of the key 105*b* is protruded by a height of z1 from the plane of the key cover 101. As an example, z1 is 0.9 millimeters.

The height z1 is provided to prevent a finger from touching the edge of a corresponding cover opening when the user operates the key group 105. When each key is pressed down, where the structure will be described later, the key travels in the z-axis direction and the y-axis direction at the same time using the traveling space. In the depression position or the release position, a traveling space of y1 long is formed between the back edge of the cover opening 101*b* and the back edge of the key 105*b* as shown in FIG. 1C, and the keycap is located almost flush with the plane of the key cover 101 as shown in FIG. 1D. Note that the positional relationship between the edge of the cover opening and the edge of the key to form the traveling space shown in FIG. 1B or 1C is just an example. For example, the traveling space may be formed on the front side in the ready position and the traveling space may be formed on the back side in the depression position or the release position. Further, the traveling spaces may be formed in the x-axis direction.

FIG. 2 is an exploded perspective view for describing a schematic structure of the keyboard 100. A pair of slider guides 103*a* and 103*b*, the key group 105, a pair of longitudinal sliders 107 and 111, transverse slider groups 109 and 113, a frame 115, a base 117, and a sensor sheet 119 are shown below the key cover 101 in this order. A cover opening is formed in the key cover 101 at a position where each key in the key group 105 is arranged, and the surface of the key cover 101 is formed flat in the other parts. The slider guides 103*a* and 103*b* mainly define traveling paths of the longitudinal sliders 107 and 111 in the y-axis direction.

The longitudinal sliders 107 and 111 slide in the y-axis direction between the ready position and the release position to slide the transverse slider groups 109 and 113 in the x-axis direction. As an example, the transverse slider group 109 includes five transverse sliders and the transverse slider group 113 includes six transverse sliders. The transverse slider groups 109 and 113 slide in the x-axis direction between the ready position and the release position.

The longitudinal sliders 107 and 111 and the transverse slider groups 109 and 113 cooperate with each other to locate the key group 105 in the ready position or the release position. The frame 115 mainly defines traveling paths of the transverse slider groups 109 and 113, and provides each key with a traveling mechanism to be described later. The base 117 secures the strength of the keyboard 100. The sensor sheet 119 provides a switching function to be closed when each key is pressed down or to be opened in the ready position.

The sensor sheet 119 can be composed of membrane switches for detecting mechanical pressure of keys, electrostatic capacity switches for detecting the proximity of electrodes, or magnetic sensors for detecting the magnetism of key magnets mounted in the keys. The longitudinal sliders 107, 111 and the base 117, for which high strength is required, are formed out of lightweight metal such as aluminum, and the other elements can be formed out of plastic materials.

Figure 3:
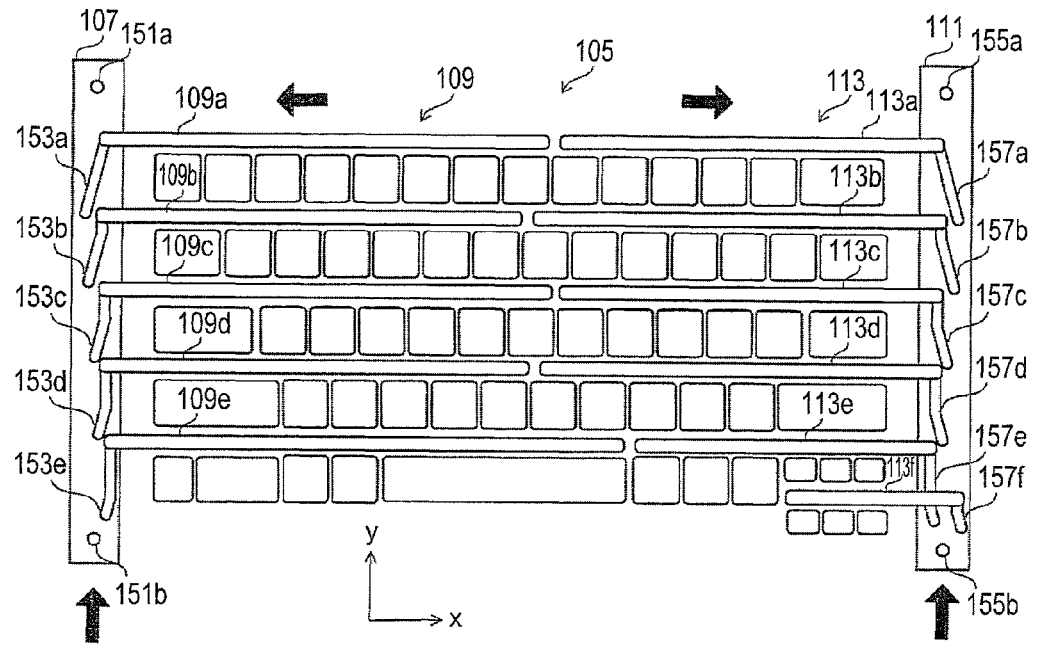
FIG. 3 is a diagram for describing the planar arrangement of longitudinal sliders, transverse slider groups, and a key group.

FIG. 3 is a diagram for describing the planar arrangement of the longitudinal sliders 107 and 111, the transverse slider groups 109 and 113, and the key group 105. The key group 105 is so arranged that multiple rows of keys will be formed in the x-axis direction, and either transverse sliders 109*a* to 109*e* or transverse sliders 113*a* to 113*f*, which make up each of the transverse slider groups 109 and 113, are arranged in line between rows. Guide openings 153*a* to 153*e* and 157*a* to 157*f* are formed in the longitudinal sliders 107 and 111, respectively. Further, driving pins 151*a*, 151*b*, 155*a*, and 155*b* protruding in the z-axis direction are formed in the longitudinal sliders 107 and 111.

The longitudinal sliders 107 and 111 are configured to slide in the y-axis direction when the user applies a force to the driving pins 151*a*, 151*b*, 155*a*, and 155*b*. Openings in which the driving pins 151*a*, 151*b*, 155*a*, and 155*b* can slide are formed in the key cover 101 so that the driving pins can be operated from the top of the key cover 101. The transverse sliders 109*a* to 109*e* slide in the x-axis direction along with sliding of the longitudinal slider 107 in the y-axis direction, and the transverse sliders 113*a* to 113*f* slide in the x-axis direction along with sliding of the longitudinal slider 111 in the y-axis direction.

Figure 4A:
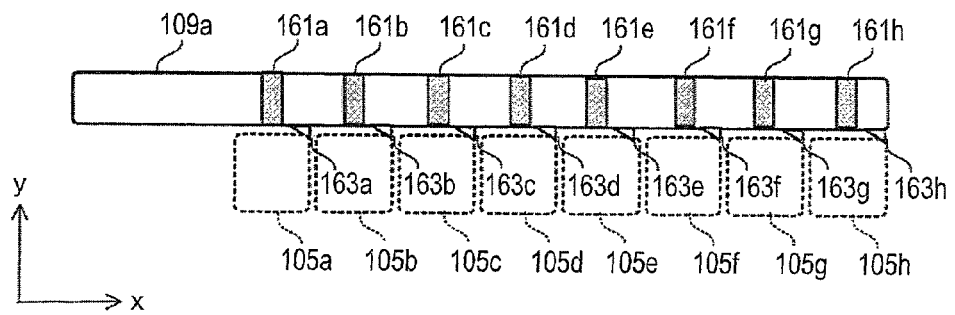
FIGS. 4A-4B are diagrams of a transverse slider that forms part of the transverse slider group.
Figure 4B:
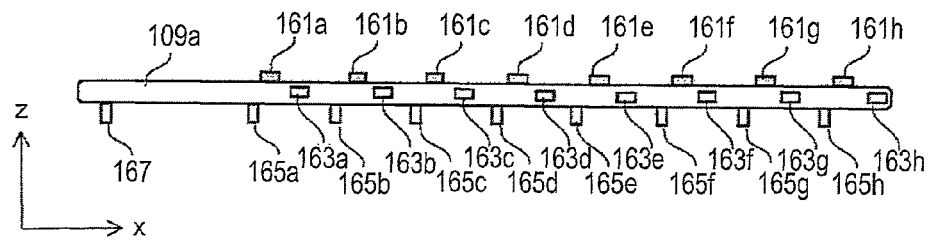

FIG. 4 is a diagram for describing the structure of the transverse slider 109*a* that forms part of the transverse slider group 109. The structure of the other transverse sliders can also be understood from FIG. 4. FIG. 4A is a plan view and FIG. 4B is a side view as viewed from the front side. Each of holding magnets 161*a* to 161*h* is mounted on the upper face of the transverse slider 109*a* at a position corresponding to the position of each of keys 105*a* to 105*h* arranged in the x-axis direction. Each of separating protrusions 163*a* to 163*h* is formed on the front side face of the transverse slider 109*a* at a position corresponding to the position of each of the keys 105*a* to 105*h*. A slide pin 167 adapted to engage in the guide opening 153*a* is formed in an end portion of the lower face of the transverse slider 109*a*.

Further, guide pins 165*a* to 165*h* adapted to engage in a guide opening 211 or the like (see FIG. 7) formed in the frame 115 are formed on the lower face of the transverse slider 109*a*. The guide pins 165*a* to 165*h* are engaged in the guide opening 211 or the like to allow the transverse slider 109*a* to travel in the x-axis direction while preventing traveling in the y-axis direction. Returning to FIG. 3, the slide pins of the transverse sliders 109*a* to 109*e* are engaged in the guide openings 153*a* to 153*e*, and the slide pins of the transverse sliders 113*a* to 113*f* are engaged in the guide openings 157*a* to 157*f*.

Each of the guide openings 153*a* and 157*a* is made up of a region including two components, namely an x component and a y component, as vector components in the direction of guiding each slide pin. The other guide openings 153*b* to 153*e* and 157*b* to 157*f* are made up of the region including two components, namely the x component and the y component, and a region including only the y component. When the longitudinal sliders 107 and 111 are slid to the back side along the y axis, the transverse sliders 109*a* to 109*e* slide to the left due to the x component of each of the guide openings 153*a* to 153e in which each slide pin is engaged, and the transverse sliders 113a to 113f slide to the right due to the x component of each of the guide openings 157a to 157f corresponding to each slide pin.

Figure 5A:
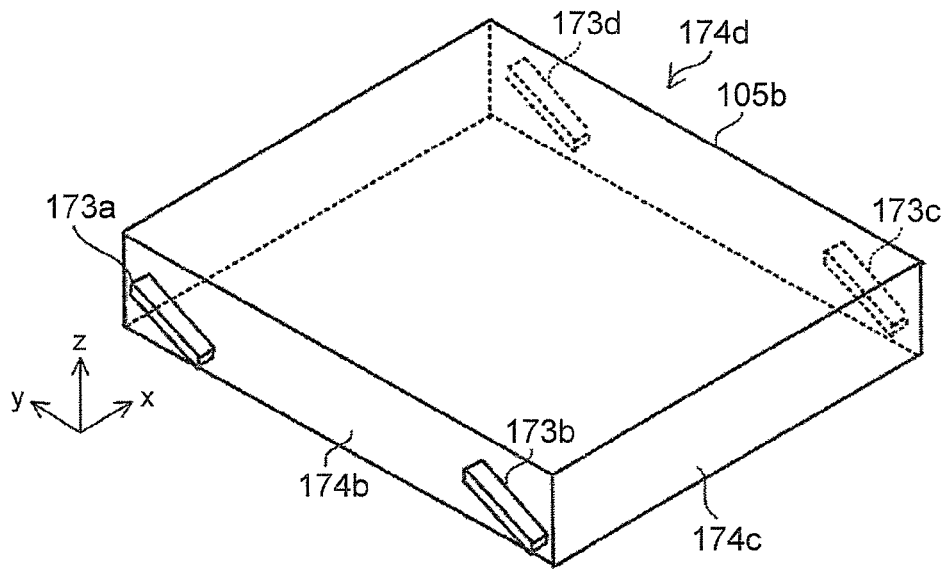
FIGS. 5A-5B are diagrams of a key that forms part of the key group.
Figure 5B:
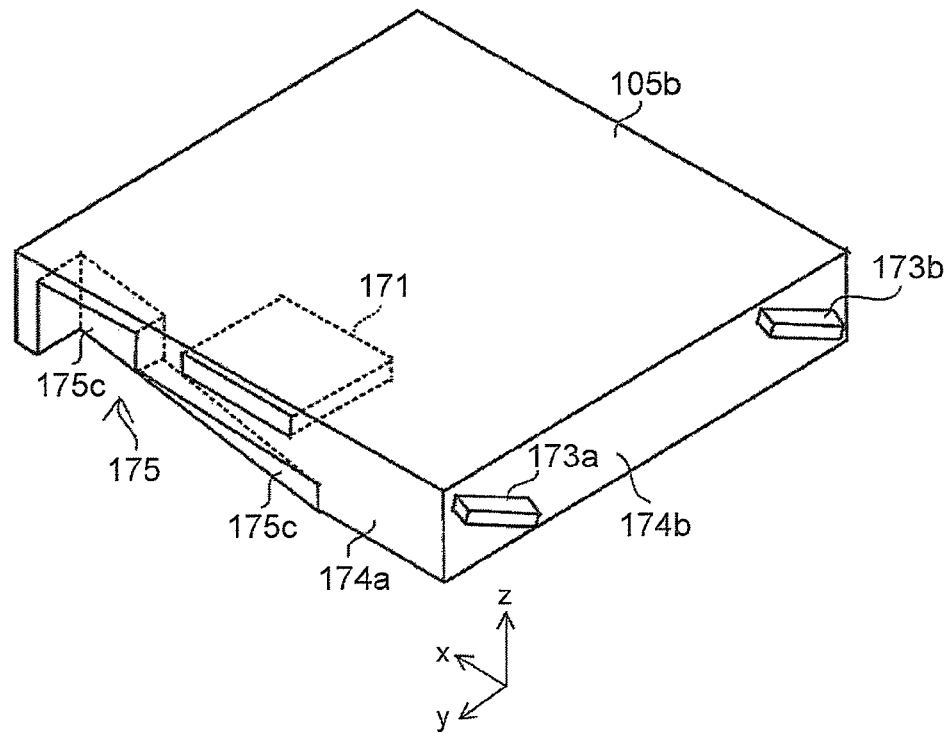

The structure of a key will be described here. FIG. 5 is a diagram for describing the structure of the key 105b that forms part of the key group 105. The structure of the other keys can also be understood from FIG. 5. FIG. 5A is a perspective view as viewed from obliquely above on the front side, and FIG. 5B is a perspective view as viewed from obliquely above on the back side. A key magnet 171 is embedded in the key 105b at a position opposite to the holding magnet 161b in the ready position. Part of the key magnet 171 is exposed from a side face 174a of the key 105b opposite to the transverse slider 109a so that the key magnet 171 will be attracted to the holding magnet 161b in the ready position.

Oblique protrusions 173a and 173b are formed on a side face 174b and oblique protrusions 173c and 173d are formed on a side face 174d. Each of the oblique protrusions 173a to 173d cooperates with a ramp structure formed on the frame 115 in a manner to be described later to provide a traveling mechanism. A recessed portion 175 is formed on the side face 174a. The recessed portion 175 includes a chamfer 175c. The chamfer 175c is perpendicular to the x-y plane and inclined from the back to the front to go up from right to left. As will be described later, the chamfer 175c cooperates with a separating protrusion 163b to provide a release mechanism.

Returning to FIG. 4, the multiple holding magnets are mounted on the flat surface of each of the transverse sliders 109a to 109e, respectively, and each holding magnet attracts the key magnet of a corresponding key to each other in the ready position. The magnetic attraction between magnets is the strongest when the magnets are attracted to each other. When the longitudinal slider 107 is slid to the back side, there is a need to separate all the holding magnets mounted on the transverse sliders 109a to 109e from the key magnets, and when the separation between all magnets is made at the same time, a great deal of power is required to drive the longitudinal slider 107.

While either of the slide pins is in engagement with a region including only the y component in the guide openings 153b to 153e in FIG. 3, any reaction force of a corresponding transverse slider is not applied even when the longitudinal slider 107 is slid in the y-axis direction. The vector components of each of the guide openings 153b to 153e are so adjusted that each of the transverse sliders 109a to 109e will not be synchronized with the timing of causing the maximum value of the reaction force to be exerted on the longitudinal slider 107 when the longitudinal slider 107 is shifted, enabling a reduction in the force applied to the longitudinal slider 107.

The guide openings 153a to 153e can be shaped into various curved lines so that the force applied to the longitudinal slider 107 when the transverse sliders 109a to 109e slide will be dispersed. In FIG. 3, reaction forces of the transverse slider 109a to the transverse slider 109e when the magnets are separated from each other as the longitudinal slider 107 is slid to the back side are applied in order. The guide openings 157a to 157f of the longitudinal slider 111 and the transverse slider group 113 are also configured to have the same relationship.

Figure 6A:
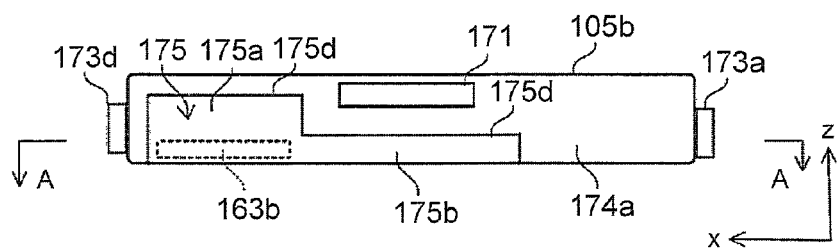
FIGS. 6A-6C are diagrams for describing planar motion when a holding magnet and a key magnet travel from a ready position to a release position at the time of sliding the transverse slider.
Figure 6B:
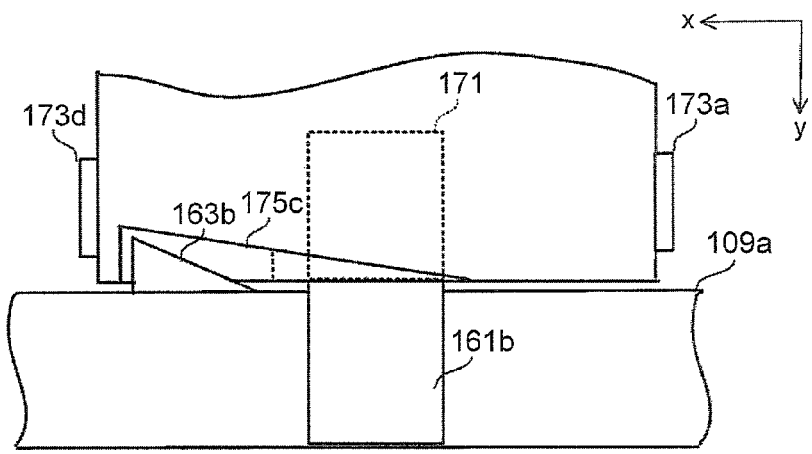
Figure 6C:
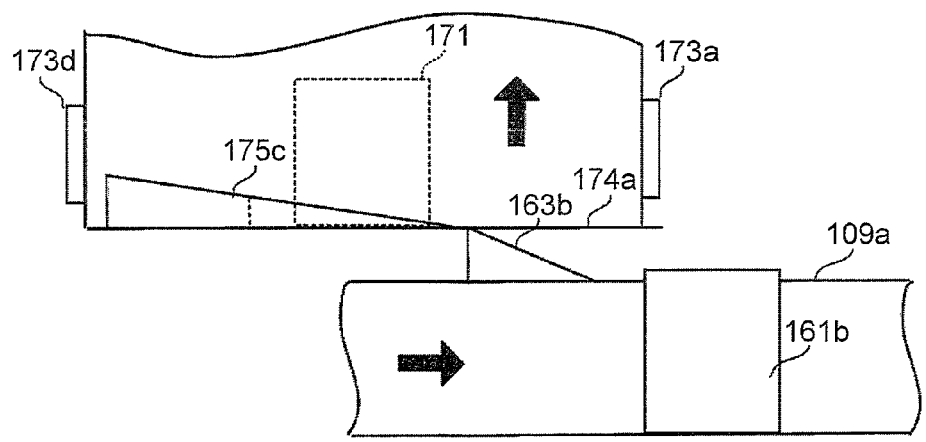

FIG. 6 is a diagram for describing planar motion when the holding magnet 161b and the key magnet 171 travel from the ready position to the release position at the time of sliding the transverse slider 109a. FIG. 6A is a side view of the back side, FIG. 6B is a cross-sectional view taken along arrow A-A of FIG. 6A to show the ready position, and FIG. 6C is a cross-sectional view in the same position as that in FIG. 6B to show the release position. The recessed portion 175 includes spatial regions 175a and 175b the z-axis direction of which is defined by a ceiling plane 175d.

In the ready position, the key 105b can use the spatial region 175a to travel downward without being subjected to any restriction from the separating protrusion 163b. When the transverse slider 109a slides to the left from the ready position, the separating protrusion 163b passes through the spatial region 175b and slides on the chamfer 175c to travel up to the side face 174a in the release position. Since the traveling of the separating protrusion 163b in the y-axis direction is restricted by the slide pin of the transverse slider 109a, the side face 174a of the key 105b is pushed by the traveling of the separating protrusion 163b to travel to the front side as shown in FIG. 6C.

Figure 7:
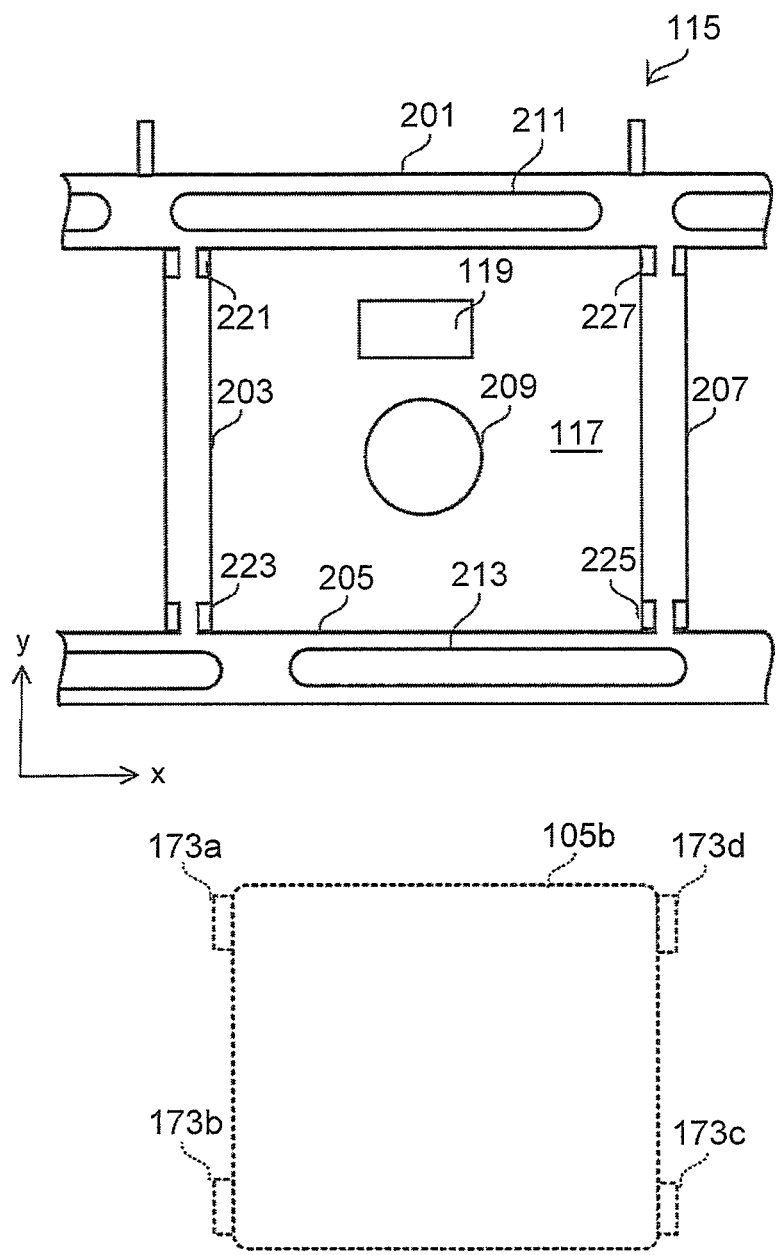
FIG. 7 is a diagram of a frame.
Figure 8:
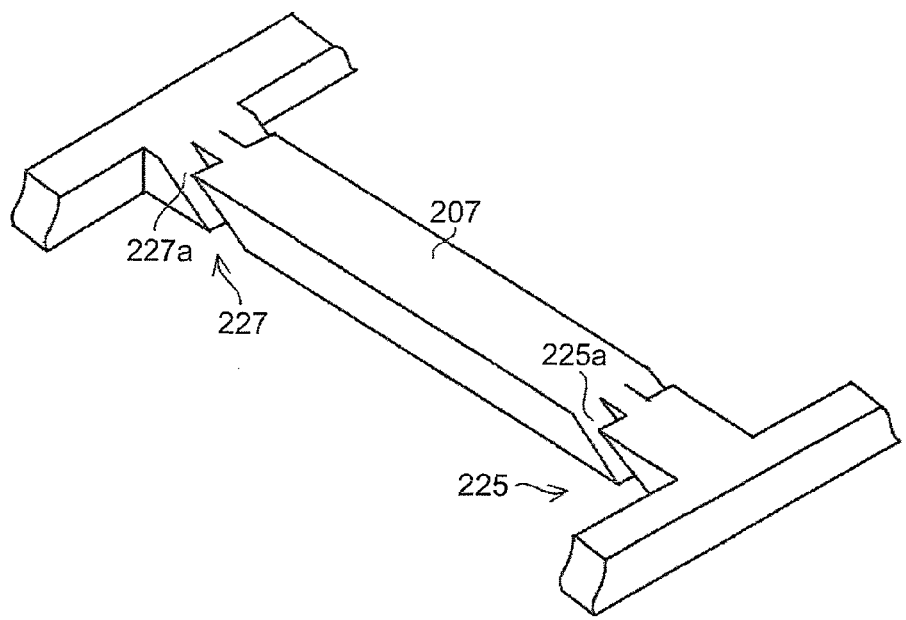
FIG. 8 is a perspective view of ramp structures.

FIG. 7 is a diagram for describing the structure of the frame 115. Although FIG. 7 shows only a part for holding the key 105b in an enlarged manner, parts of the other keys also have the same structure. FIG. 8 is a perspective view for describing ramp structures 225 and 227. The other ramp structures are also made up in the same manner. A region in which the key 105b is arranged is surrounded by side walls 201 to 207. The side walls 203 and 207 also have a role in supporting the key cover 101. The base 117 is exposed in the bottom of the region in which the key 105b is arranged. An opening is formed in a part of the base 117, and the sensor sheet 119 is exposed therefrom. A thin elastic member 209 is mounted on the base 117 to serve as a cushion for the depressed key 105b.

In the side walls 201 and 205, the guide openings 211 and 213 into which the guide pins of the transverse sliders 109a and 109b are inserted are formed, and the transverse sliders 109a and 109b are placed on the upper surface thereof. In the side walls 203 and 207, the ramp structures 221 to 227 are formed. When the key 105b is placed in the frame 115, the ramp structures 221 to 227 and the oblique protrusions 173a to 173d of the key 105b are engaged with each other to provide a traveling mechanism for making the depressed key 105b travel to the downside and the front side at the same time.

Figure 9A:
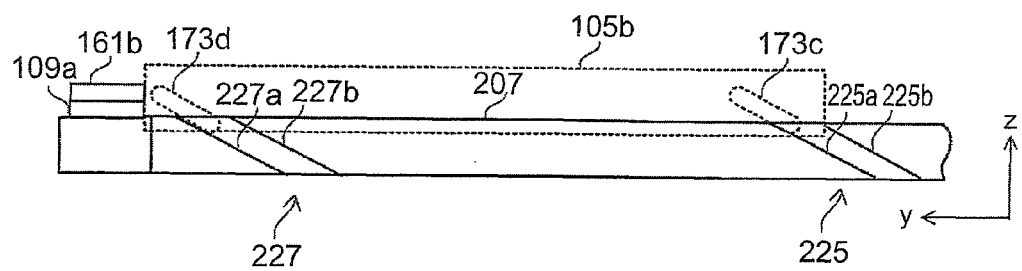
FIGS. 9A-9B are diagrams for describing a state in which oblique protrusions of the key are engaged with the ramp structures.
Figure 9B:
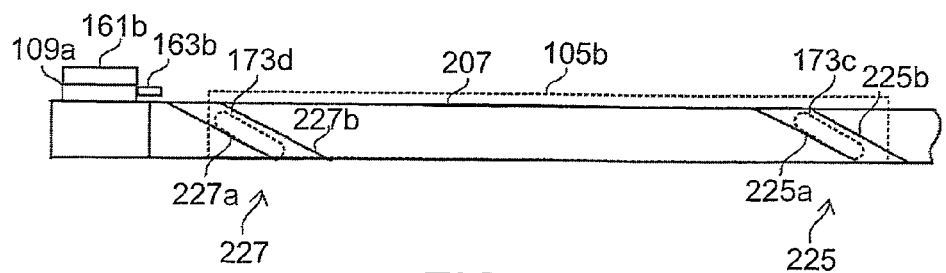

As shown in FIG. 8, the ramp structures 225 and 227 include floor-side chamfers 225a and 227a inclined downward to the front side, and ceiling-side chamfers 225b and 227b (see FIG. 9) opposite to the chamfers 225a and 227a. FIG. 9 is a diagram for describing a state in which the oblique protrusions 173c and 173d of the key 105b are engaged with the ramp structures 225 and 227. FIG. 9A shows the ready position and FIG. 9B shows the release position.

As shown in FIG. 9A, the key magnet 171 of the key 105b and the holding magnet 161b are attracted to each other in the ready position to locate the key 105b on the backmost side. The oblique protrusions 173c and 173d are positioned outside of the spatial regions formed by the chamfers 225a, 225b and the chamfers 227a, 227b of the ramp structures 225 and 227. However, the key 105b is not separated from the frame 115 because the key 105b is constrained by the holding magnet 161b.

A structure for mechanically binding the key 105b in the ready position may also be provided in the frame 115 or the transverse slider 109a so that the key 105b will not be separated from the keyboard 100 against the magnetic attraction between magnets. As shown in FIG. 9B, the oblique protrusions 173c and 173d slide on the chamfers 225a and 227a of the ramp structures in the release position to travel frontward and downward at the same time. The same holds true for a case where the oblique protrusions 173a and 173b slide on the ramp structures 221 and 223.

Figure 10A:
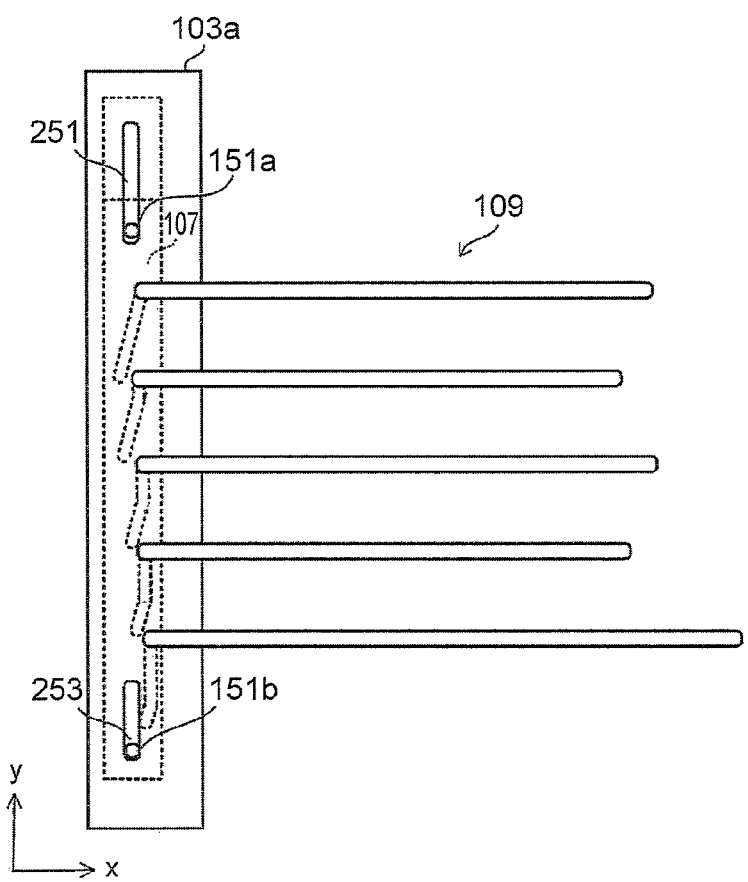
FIGS. 10A-10B are diagrams of a slider guide.
Figure 10B:
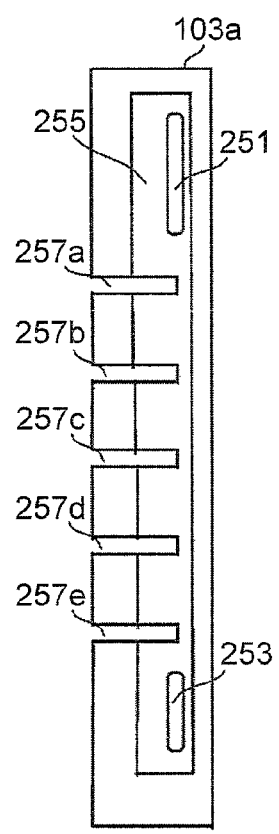

FIG. 10 is a diagram for describing the structure of the slider guide 103a. The structure of the slider guide 103b can also be understood from FIG. 10. FIG. 10A is a plan view and FIG. 10B is a bottom view. The transverse slider group 109 is also shown in FIG. 10A. A guide groove 255 along which the longitudinal slider 107 slides in the y-axis direction is formed on the bottom face of the slider guide 103a, and guide openings 251 and 253 are formed in the bottom face of the guide groove 255.

The driving pins 151a and 151b of the longitudinal slider 107 are inserted into the guide openings 251 and 253, respectively. Further, slits 257a to 257e that function as guides for making each of the transverse sliders 109a to 109e travel smoothly in the x-axis direction are formed in the x-axis direction of the slider guide 103a. The slider guide 103a is fixed on the base 117 to play not only a role in preventing the longitudinal slider 107 sliding in the y-axis direction from traveling in the x-axis direction due to the reaction force of the transverse slider group 109, but also a role in preventing large stress from being applied to each transverse slider in the vicinity of the slide pin.

Referring next to FIG. 6 and FIG. 9, the operation of the keyboard 100 will be described. Although the operation of the key 105b will be described below as a representative of the key group 105, the other keys also operate the same way. In FIG. 6B and FIG. 9A, the key magnet 171 and the holding magnet 161b are attracted to each other in the ready position. First, the operation of the key 105b when traveling from the ready position to the depression position will be described. Since the transverse slider 109a is located in the ready position before the key 105b in the ready position is pressed down, the key 105b can travel downward by the presence of the spatial region 175a even if the separating protrusion 163a exists.

Suppose that the depressing force is enough to separate the holding magnet 161b and the key magnet 171 from each other. In this case, the depressed key 105b is so operated that the oblique protrusions 173a to 173d travel frontward and downward at the same time while sliding on the floor-side chamfers of the ramp structures 221 to 227. In the key 105b, the oblique protrusions 173a to 173d are prevented by the ramp structures 221 to 227 from traveling in the x-axis direction. During traveling, the posture of the keycap is maintained in a horizontal position by the traveling mechanism provided in four portions. When the bottom of the key 105b touches the elastic member 209 and hence is slightly dented, the user feels a strong reaction force so that the user can relax the pressure of the finger. The switch mechanism of the sensor sheet 119 is activated just before or after the bottom of the key 105b touches the elastic member 209 to detect the depression of the key 105b.

In the depression position, the key magnet 171 has traveled downward and frontward from the ready position against the holding magnet 161b. However, the intensity of the magnetic field between both magnets are so adjusted that a magnetic attraction enough to return the key 105b to the ready position will remain. When the user lifts the finger off the keycap, the oblique protrusions 173a to 173d go up between the floor-side chamfers and the ceiling-side chamfers of the ramp structures 221 to 227 by the magnetic attraction between the holding magnet 161b and the key magnet 171 to return the key 105b to the ready position.

Next, the operation of the key 105b when traveling from the ready position to the release position will be described. When the user applies a force to the driving pins 151a and 151b to move the longitudinal slider 107 in the backward direction up to the release position, the tip of the separating protrusion 163b presses against the chamfer 175c to separate the holding magnet 161b from the key magnet 171, gradually widening the distance between both magnets. At the same time, the holding magnet 161b travels to the left away from the key magnet 171. As the distance between the holding magnet 161b and the key magnet 171 is widened in the x-axis direction and the y-axis direction, the magnetic attraction between both magnets exponentially drops.

Then, when the separating protrusion 163b comes to touch the side face 174a of the key 105b in due course, the gravity of the key 105b becomes larger than the magnetic attraction between the magnets, and the key 105b comes down by gravity. The key 105b travels up to the release position through the traveling mechanism like in the case when it is pressed down. Even when the keyboard 100 is flipped upside down, the key 105b is maintained in the release position because the oblique protrusions 173a to 173d are blocked by the upper chamfers of the ramp structures.

Even if the oblique protrusions 173a to 173d try to go up between the floor-side chamfers and the ceiling-side chamfers of the ramp structures 221 to 227 to return the key 105b to the ready position, the separating protrusion 163b located in the release position hits against the side face 174a of the key 105b to prevent the key from being returned to the ready position. Thus, the key 105b is maintained in the release position regardless of the posture of the keyboard as long as the transverse slider 109a is located in the release position.

Next, the operation of the key 105b when traveling from the release position to the ready position will be described. When the longitudinal slider 107 is slid frontward to return to the ready position, the transverse slider group 109 also slides to the right to return to the ready position. In the ready position, since the separating protrusion 163b is located in a position corresponding to the spatial region 175a, the key 105b travels upward and hence the operation of traveling to the ready position is not blocked. When the positions of the holding magnet 161b and the key magnet 171 in the x-axis direction are aligned, the magnetic attraction between both magnets sharply increases to return the key 105b to the ready position through the traveling mechanism.

In the above description, the longitudinal sliders, transverse sliders, the separating protrusions formed on the transverse sliders, and the recessed portions formed on the keys mainly function as the release mechanism to make the key group 105 travel from the ready position to the release position. The release mechanism is configured to implement the following three functions: A function (first function) of increasing the distance between the holding magnet and the key magnet to reduce the magnetic attraction between both magnets in the ready position; a function (second function) of locating a key in the release position, where the magnetic attraction to the key drops; and a function (third function) of keeping the key in the release position.

The first function is implemented by the frontward separation of the key magnet 171 by means of the separating protrusion 163b and the chamfer 175c of the recessed portion 175 and by the leftward separation of the holding magnet 161b by means of the longitudinal slider 107 and the transverse slider 109a. The second function is implemented by the weight of the key 105b. The third function is implemented by the engagement between the ceiling-side chamfers 225b, 227b of the ramp structures 225, 227 and the oblique protrusions 173c, 173d, and by the separating protrusion 163b and the side face 174a of the key 105b located in the release position.

The first function can also be implemented only by the leftward separation of the holding magnet 161b by means of the longitudinal slider 107 and the transverse slider 109a. The second function can also be implemented by applying a force other than the gravity to the key. The third function can also be implemented by using a magnet instead of the separating protrusion 163b. Next, another example of the release mechanism for implementing these functions will be described.

Figure 11A:
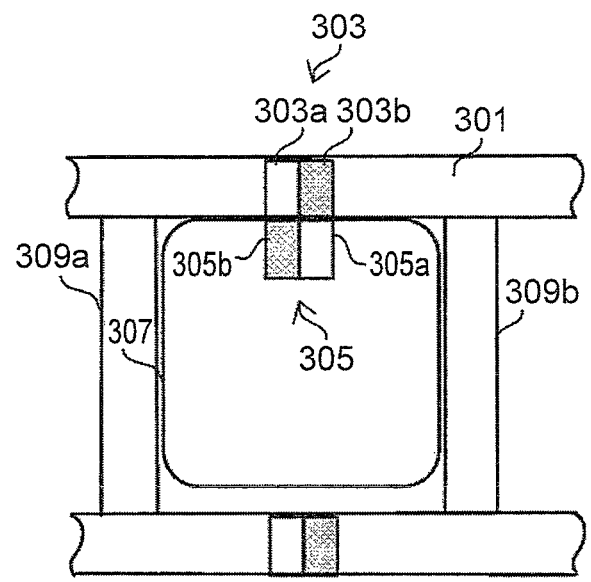
FIGS. 11A-11B are plan views of another release mechanism.
Figure 11B:
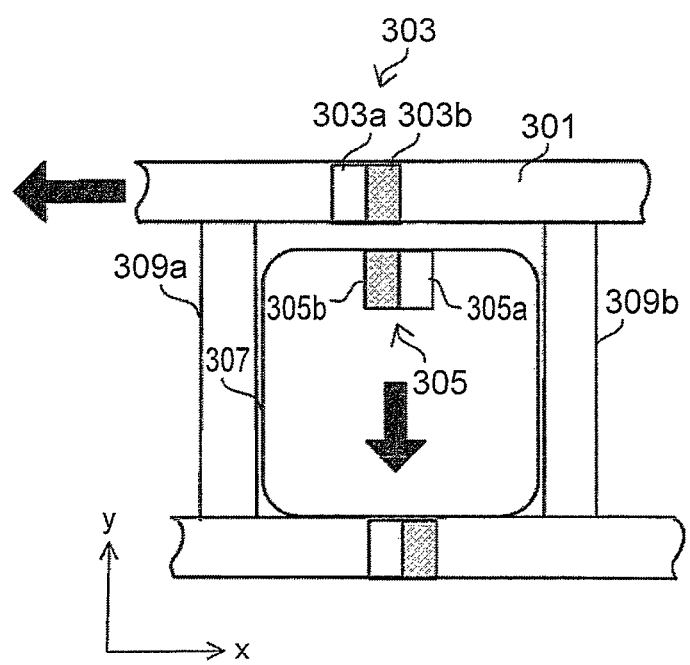

FIG. 11 is a plan view for describing the structure of another release mechanism. FIG. 11A shows the ready position and FIG. 11B shows the release position. A key 307 is shown in FIG. 11 in such a state that a key magnet 305 is exposed, but the actual position of the key magnet 305 in the z direction is on the lower side of the keycap as described with reference to FIG. 5 and FIG. 6.

The structure of a traveling mechanism made up of the key 307 and side walls 309a and 309b of the frame is the same as that described with reference to FIG. 7 to FIG. 9. A holding magnet 303 is mounted on a transverse slider 301. A guide (not shown) is so provided on the frame that the transverse slider 301 can slide in the x-axis direction but is constrained not to travel upward and backward. The holding magnet 303 is so arranged that an N pole 303b and an S pole 303a face each other in the x-axis direction. The key magnet 305 is so arranged that an S pole 305a and an N pole 305b face each other in the x-axis direction to create a magnetic attraction with the holding magnet 303 in the ready position.

When the transverse slider 301 is slid to the left as shown in FIG. 11B to travel up to the release position, the N pole 303b of the holding magnet 303 comes to face the N pole 305b of the key magnet 305. This causes a magnetic repulsion between both magnets, so that the key 307 travels not only frontward but also downward by the repulsion and gravity at the same time, thus locating the key 307 in the release position.

The key 307 located in the release position is prevented from returning to the ready position due to the repulsion between the N pole 303b of the holding magnet and the N pole 305b of the key magnet. When the transverse slider 301 is slid in the x-axis direction, this structure creates a magnetic attraction between the holding magnet 303 and the key magnet 305 in the ready position and creates a repulsion in the release position to implement the first function, the second function, and the third function.

Figure 12A:
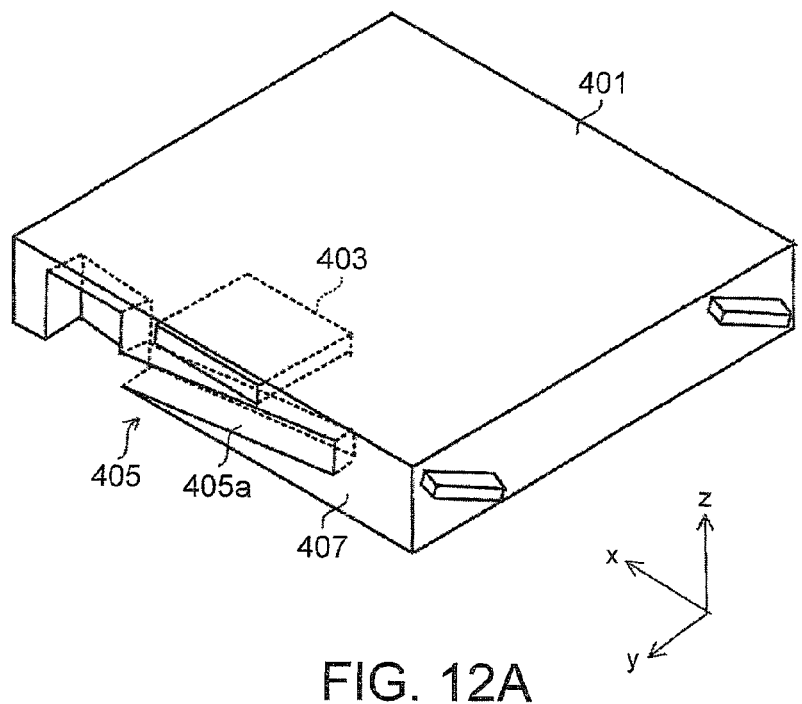
FIGS. 12A-12C are diagrams of yet another release mechanism.
Figure 12B:
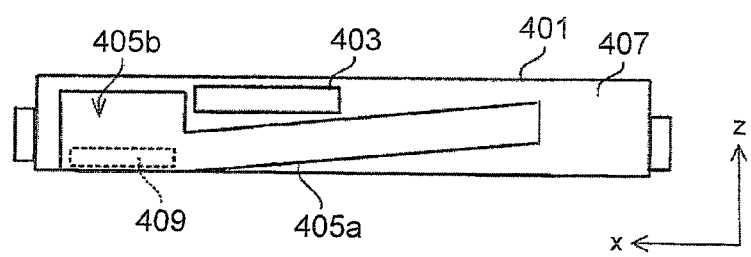
Figure 12C:
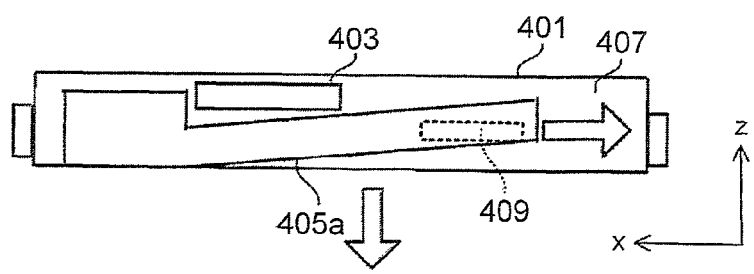

FIG. 12 is a diagram for describing the structure of yet another release mechanism. FIG. 12A is a perspective view as viewed from the back side of a key 401, FIG. 12B is a side view of the back side to show the ready position, and FIG. 12C is a side view of the back side to show the release position. The structure of a traveling mechanism is the same as that described with reference to FIG. 7 to FIG. 9. A recessed portion 405 including a floor-side chamfer 405a is formed on a back side face 407 of the key 401.

In this structure, a holding magnet (not shown) is fixed to a frame (not shown) not to travel in either direction in the ready position and the release position. A separating protrusion 409 is formed on a transverse slider (not shown), and a guide is provided on the frame though not shown in the figure so that the transverse slider will not travel upward. The separating protrusion 409 travels in the x-axis direction together with the transverse slider between the ready position and the release position while keeping the position in the z-axis direction.

As shown in FIG. 12B, the key 401 is positioned on the uppermost side relative to the separating protrusion 409 in the ready position. Since the recessed portion 405 includes a spatial region 405b on the upper side of the separating protrusion 409, the recessed portion 405 can travel downward when being pressed down in the ready position. The separating protrusion 409 slides on the chamfer 405a when traveling leftward up to the release position.

As shown in FIG. 12C, the chamfer 405a receives a downward force from the separating protrusion 409 whose traveling in the z-axis direction is prevented, and travels up to the release position. The key 401 is positioned on the lowermost side relative to the separating protrusion 409 in the release position. At this point, the key 401 travels downward and frontward at the same time by means of the traveling mechanism. Since the chamfer 405a is prevented from traveling upward by the separating protrusion 409 even in the release position, the key never returns to the ready position even when the keyboard is flipped upside down. When the transverse slider is returned to the ready position, the constraint on the chamfer 405a imposed by the separating protrusion 409 is released and hence the key 401 returns to the ready position. The release mechanism in FIG. 12 uses the chamfer 405a and the separating protrusion 409 to implement the first function to the third function.

The keyboard 100 uses the magnetic attraction between the key magnet and the holding magnet, but the keyboard can also be configured such that a strong magnet is used as either one and a magnetic metal piece attracted to the magnet is used as the other. Since the keyboard 100 can be configured to make the surface of the key cover 101 almost flat in the release position, it is convenient to consider a case where a touch sensor is incorporated and used as a touch pad as well. The keyboard 100 can also be applied to a convertible type laptop PC usable in either a PC mode or a tablet mode.

Figure 13A:
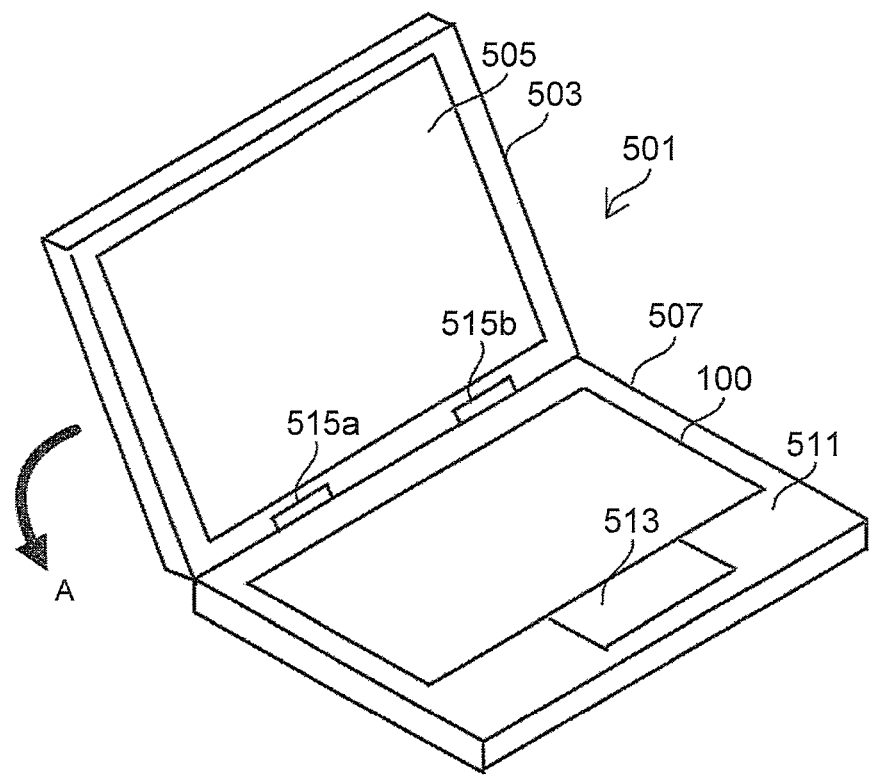
FIGS. 13A-13B are diagrams for describing an example in which the keyboard is applied to a convertible type laptop PC.

FIG. 13 is a diagram for describing an example in which the keyboard 100 is applied to a convertible type laptop PC 501. FIG. 13A shows a state of use in a PC mode. The laptop PC 501 is used in such a state that a display housing 503 that houses a display 505 functioning as a touch screen is opened from a system housing with the keyboard 100 and a touch pad 513 mounted on a surface 511. In the PC mode, the keyboard 100 can be set in the release position and used as the touch pad as well.

Further, if the keyboard 100 is set in the release position when the display housing 503 is closed, the whole thickness can be made thin. When the driving pins 151a, 151b, and 155a, 155b shown in FIG. 3 are used to make keys travel to the release position, guide openings are provided on the surface of the key cover 101 so that the driving pins can move. The guide openings can be formed in recessed portions provided on the key cover so that the top of the driving pins will not protrude from the surface of the key cover. Note that the laptop PC 501 includes a new release mechanism for interlocking sliding of the longitudinal sliders with opening and closing of the display housing 503.

Figure 13B:
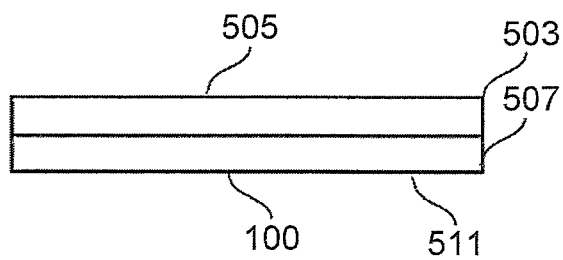
Figure 15A:
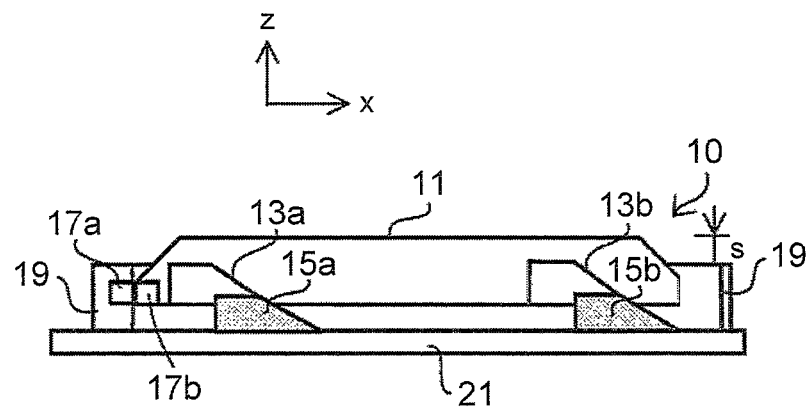
FIGS. 15A-15C are cross-sectional views for describing a conventional oblique slide-type keyboard.
Figure 15B:
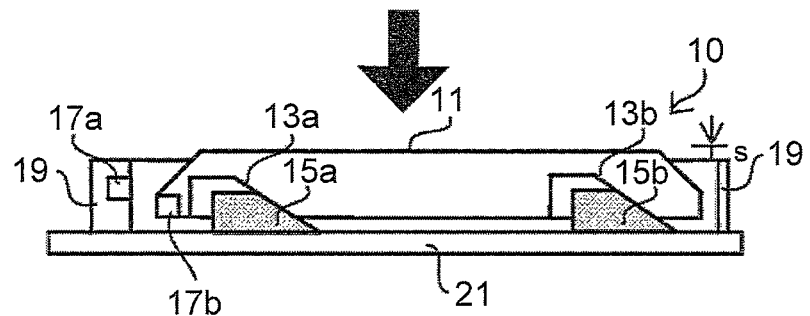
Figure 15C:
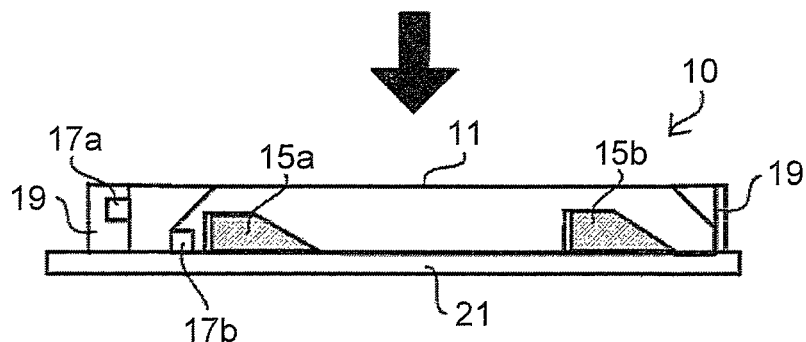

The laptop PC 501 can be used in a tablet mode by pivoting the display housing 503 almost 360 degrees on hinge blocks 515a and 515b in a direction of arrow A from the closed state. When the laptop PC 501 is used in the tablet mode, the surface 511 of a system housing 507 is positioned on a desk or the user's lap as shown in FIG. 13B. In the ready position, since keycaps of the keyboard 100 protrude from the surface 511 and are likely to be damaged, it is desired to locate the keyboard 100 in the release position during the tablet mode.

FIG. 14 is a diagram for describing the structure of a release mechanism 601 employed in the laptop PC 501. In FIGS. 14A to 4C, left sides are side views, and right sides are plan views corresponding to the side views, respectively. The release mechanism 601 is configured to operate in cooperation with the hinge block 515a. The hinge block 515a includes a clutch 603 and a fixed part 607. The hinge block 515a is fixed to the system housing 507, and the fixed part 607 is coupled to the display housing 503. The hinge block 515a applies a proper frictional force to the rotating operation so that the display housing 503 can stop at an arbitrary position when it is opened.

The release mechanism 601 includes a cylindrical gear 605, a metal sheet 651, a longitudinal slider 653, and a transverse slider 657. When coupling to the clutch 603 of the hinge block 515*a*, the gear 605 rotates about a shaft common to the hinge block 515*a* according to the rotation of the fixed part 607. Multiple protrusions 609 are formed around the gear 605 with regularity. Multiple openings in which the protrusions 609 are engaged are formed in the metal sheet 651 in a continuous fashion. One end of the metal sheet 651 is fixed to the gear 605, and the other end is fixed to an end of the longitudinal slider 653.

When the gear 605 rotates, the metal sheet 651 is wound into or delivered from the gear 605 to apply, to the longitudinal slider 653, a force in the y-axis direction. The metal sheet 651 is required to have not only flexibility to a degree that the metal sheet 651 can be wound into the gear 605, but also rigidity to the push-out force as well as the tensile force. In order to enhance the rigidity when the metal sheet 651 is delivered, a guide member can be provided, which guides the metal sheet 651 while nipping the upper lower sides of the metal sheet 651 in a delivered portion so that the cross section of the delivered portion of the metal sheet will be warped in an arch shape like a metal tape measure. A guide opening 655 in which a guide pin (not shown) of the transverse slider 657 is engaged is formed in the longitudinal slider 653.

Unlike the guide opening described with reference to FIG. 3, the guide opening 655 is made up of a region including two components of a y component and a leftward x component, a region including two components of the y component and a rightward x component, and a region including only the y component. Therefore, when the metal sheet 651 is delivered in the state of the release position in FIG. 14A to shift the longitudinal slider 653 frontward, the transverse slider 657 first shifts to the right, then stops shifting in the ready position for a while, and shifts to the left in due course to return to the release position. A key 659 is placed in the neighborhood of the transverse slider 657. The structure in which the transverse slider 657 shifts in the x-axis direction in conjunction with shifting of the longitudinal slider 653 in the y-axis direction to locate the key 659 in the ready position or the release position is the same as that described above.

Next, the operation of the release mechanism 601 will be described in detail. FIG. 14A shows the closed state of the display housing 503, where the transverse slider 657 travels to the left end to locate the key 659 in the release position. Suppose that the angle (display angle) between the display housing 503 and the system housing 507 at this point is zero degrees. In this case, when the display angle is widened from the state in FIG. 14A, the longitudinal slider 653 shifts frontward, and along with this, the transverse slider 657 is guided by the region including the rightward x component of the guide opening 655 to shift rightward.

Then, when the display angle comes to 80 degrees, the position of the key 659 is changed from the release position to the ready position. FIG. 14B shows a state when the display angle is in a range between 80 degrees and 145 degrees. In this range, since the guide opening 655 includes no x component, the transverse slider 657 does not shift even when the display angle is changed to make the longitudinal slider 653 slide, and this enables use of the laptop PC 501 in the PC mode.

Further, when the display angle exceeds 145 degrees, the guide pin is engaged with the region including the leftward x component of the guide opening 655 to make the transverse slider 657 shift to the left. FIG. 14C shows a state when the display angle comes close to 180 degrees. When the display angle reaches 180 degrees, the key 659 is located in the release position.

The hinge block 515*a* is configured to be coupled while the display angle is in a range from zero degrees to 180 degrees, and decoupled from when the display angle exceeds 180 degrees until it reaches 360 degrees. Therefore, even when the display angle exceeds 180 degrees, the metal sheet 651 is not delivered any more. When the display angle is 360 degrees, the state is as shown in FIG. 13B, where the keyboard 100 is located in the release position. Note that the display angles described here are just an example, and the display angles can be selected arbitrarily within the spirit and scope of the present invention.

As has been described, the present disclosure provides a thin keyboard that locates each key in a ready position by means of magnets.

While the disclosure has been particularly shown and described with reference to a preferred embodiment, it will be understood by those skilled in the art that various changes in form and detail may be made therein without departing from the spirit and scope of the disclosure.

What is claimed is:

1. An input device comprising:
   a key having a key magnet mounted therein;
   a holding magnet for locating said key in a ready position via magnetic attraction to said key magnet;
   a release mechanism for increasing distance between said holding magnet and said key magnet to make said key travel from said ready position to a release position, wherein said release mechanism having a plurality of holding magnets mounted therein includes a first slider configured to slide across a plurality of keys in a horizontal direction; and
   a traveling mechanism for making said key travel in a vertical direction and said horizontal direction simultaneously when said key travels from said ready position to said release position.

2. The input device of claim 1, wherein said first slider includes a separation mechanism for applying, to said key, a force in a direction to separate said key magnet from said holding magnet.

3. The input device of claim 2, wherein said separation mechanism prevents said key located in said release position from traveling to said ready position.

4. The input device of claim 1, wherein said traveling mechanism includes a ramp structure for causing said key to come down up to said release position by gravity when magnetic attraction between said key magnet and said holding magnet becomes lower than said magnetic attraction in said ready position.

5. The input device of claim 4, wherein said ramp structure includes a prevention mechanism for preventing said key located in said release position from traveling in said vertical direction.

6. The input device claim 1, wherein said release mechanism includes a second slider sliding in said horizontal direction to slide a plurality of first sliders.

7. The input device of claim 6, wherein said second slider includes a timing adjustment mechanism for delaying timing of causing a maximum value of a reaction force exerted on said second slider by each of said plurality of first sliders.

8. The input device of claim 1, further comprising a key cover arranged around said plurality of keys in such a manner that a top of said keys is protruded from said key cover in said ready position and said top of said keys is located almost flush with said key cover in said release position.

9. A portable computer comprising:
  a display housing having a screen mounted thereon;
  a system housing having a keyboard mounted thereon, wherein said keyboard includes
    a key having a key magnet mounted therein;
    a holding magnet for locating said key in a ready position via magnetic attraction to said key magnet;
    a release mechanism for increasing distance between said holding magnet and said key magnet to make said key travel from said ready position to a release position, wherein said release mechanism having a plurality of holding magnets mounted therein includes a first slider configured to slide across a plurality of keys in a horizontal direction; and
    a traveling mechanism for making said key travel in a vertical direction and said horizontal direction simultaneously when said key travels from said ready position to said release position.

10. The portable computer of claim 9, wherein said portable computer is a convertible type that can be used both in a PC mode, where said system housing is placed with a bottom face down, and in a tablet mode where said display housing is turned until said display housing backs to said system housing and said system housing is placed with a face having said keyboard down.

11. The portable computer of claim 10, wherein said release mechanism locates said keyboard in said release position in conjunction with turning of said display housing at least when said display housing is closed and during said tablet mode, and locates said keyboard in said ready position during said PC mode.

12. A method comprising:
  causing a holding magnet to locate a key in a ready position by a magnetic attraction to a key magnet, wherein an X axis, a Y axis and a Z axis are defined for said key and which is located in a ready position by means of said magnets;
  reducing said magnetic attraction to said key magnet by changing a position of said holding magnet relative to said key magnet in said X-axis direction and by changing a position of said key magnet relative to said holding magnet in said Y-axis direction; and
  locating said key in a release position by gravity on said key.

13. The method of claim 12, further comprising:
  returning said position of said holding magnet relative to said key magnet up to said ready position; and
  keeping said key in said release position until said position of said holding magnet is returned to said ready position.

14. The method of claim 13, wherein reducing said magnetic attraction includes making said holding magnet and said key magnet exert a magnetic repulsion.

* * * * *